Figure 1:
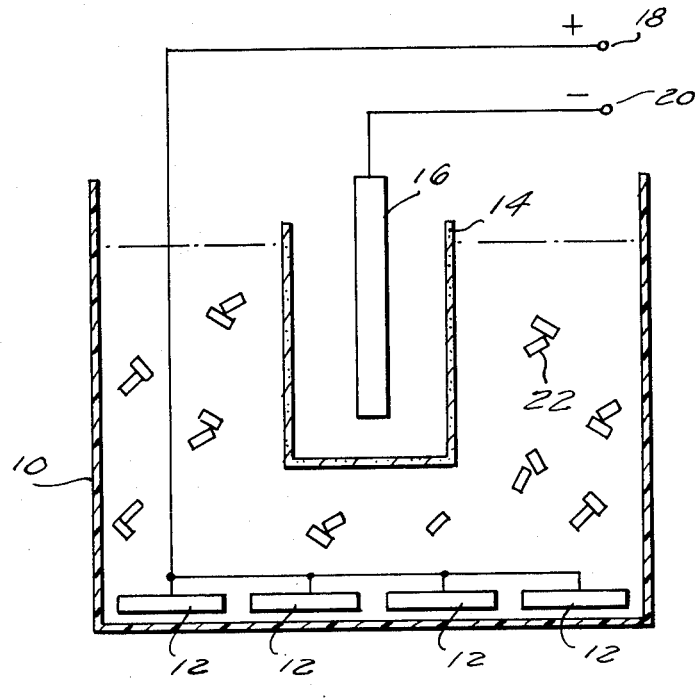

United States Patent [19]

Lancy

[11] 3,719,570
[45] March 6, 1973

[54] ELECTROLYTIC PROCESS
[75] Inventor: Leslie E. Lancy, Ellwood City, Pa.
[73] Assignee: Resource Control, Inc., West Haven, Conn.
[22] Filed: July 8, 1970
[21] Appl. No.: 53,333

[52] U.S. Cl. .................................. 204/151, 204/149
[51] Int. Cl. ........................... B01k 3/10, B01k 3/00
[58] Field of Search ........................... 204/149, 151

[56] References Cited

UNITED STATES PATENTS

| | | | |
|---|---|---|---|
| 982,704 | 1/1911 | Bull | 204/151 X |
| 1,194,000 | 8/1916 | Dobyns et al. | 204/149 X |
| 2,788,319 | 4/1957 | Pearson | 204/151 |
| 2,997,430 | 8/1961 | Foyn | 204/151 |
| 3,438,879 | 4/1969 | Kircher et al. | 204/296 |
| 3,616,356 | 10/1971 | Roy | 204/152 |

Primary Examiner—J. Tung
Assistant Examiner—A. C. Prescott
Attorney—Curtis, Morris & Safford

[57] ABSTRACT

A process and cell produces an oxidant or reductant from a solution containing an electrolytically decomposable oxidation or reduction causing precursor compound for use with a waste solution, the oxidant or reductant being obtained by adding an electrolytically decomposable precursor compound to a solution in a vessel having an anode and cathode, one of which is isolated in a porous cup, so that when an electrical current flows between the electrodes the desired oxidizer or reductant will be formed outside the isolated electrode.

22 Claims, 3 Drawing Figures

ELECTROLYTIC PROCESS

BACKGROUND OF THE INVENTION

This invention relates to electrolytic regeneration cell and process and more particularly to pollutant and noxious or toxic substance destruction in an economically attractive process and in a facile manner.

In the treatment of various waste products, noxious or pollutant producing constituents are introduced into the discharge streams in quantities which are exceedingly small, but which require treatment of large masses or volumes of liquids to remove the undesired components. It has been suggested to use oxidizing agents to do this by the introduction of such agents into large bodies of liquids accumulated in settling tanks or basins. Such oxidizing agents have consisted for example of chlorine or hypochlorite solutions either individually or admixed at various stages of the process or introduced into the settling tanks or treatment solution reservoirs in their precursor form.

Further, in destroying large amounts of noxious substances, it has heretofore been extremely wasteful to dispose of these substances because of the extremely low concentration of these materials in various diluents such as water. In addition precautionary steps must be employed to render these substances innocuous. For example, disposal of various gases which are exceedingly toxic has been difficult, such as when disposing of chemical warfare or contact poison gases. Heretofore, it has often required the destruction of these gases or waste material by incineration, underground injection, storage in containers or containers which can be sunk into large bodies of water for disposal. As can be appreciated, these methods, while hopefully adequate, leave considerable doubt as to the final disposal of these materials without a lingering risk of unwanted escape or air pollution.

Further, other reactions based on chemical considerations in which reactants are added for altering the chemical nature of the pollutants or other undesirable materials is also unsatisfactory because of creation of yet another material which has to be disposed. In other cases large volumes of water must be handled.

SUMMARY OF THE INVENTION

It has now been found that numerous pollutants and noxious or toxic substances may be readily decomposed by oxidation or reduced in dilute solutions or in liquids containing various degrees of concentration of these materials, if the oxidation or reduction reaction is carried out in an electro-chemical process which is based on the following: (a) electrolytic generation of oxidation or reduction materials, (b) a destruction of the undesired substance, (c) a reusability of the oxidation or reduction causing substance or their precursors at conditions which are highly efficient and wherein the degree of destruction of these undesired materials exceeds heretofore known methods.

Thus, the present invention is directed to electrochemical production of an oxidant and destruction of pollutants, toxic, or noxious substances in an electrolytic oxidation cell into which are introduced oxidation producing precursors. In this cell the oxidation producing materials are continuously maintained at a certain effective level while the oxidized pollutant or noxious or toxic substances are continuously being introduced into the cell are rendered innocuous. Furthermore, within the scope of the present invention this destruction may be achieved by removal of or minimuzation of the reducing agents at the cathode.

More specifically, just to name a few examples, the present invention is directed to the destruction of a number of noxious substances such as cyanide compounds in metal finishing operation, toxic substances such as hydrocyanic acid or highly toxic organic substances such as mustard gas ($\beta,\beta'$dichlorodiethyl sulfide). The chemical reactions which furnish the oxidizing agents and the basis of the destruction of the various pollutants or noxious or toxic substances are illustrated herein as follows:

(I) $H_2O + O_2 - 2e \rightarrow O_3 + H_2$ (ozone)
(II) $2H_2O + 2e \rightarrow H_2O_2\ H_2$ (hydrogen peroxide)
(III) $2SO_4^- - 2e \rightarrow S_2O_8^-$ (persulfate)
(IV) $2NaCl + H_2O-e \rightarrow NaOCl + NaCl + H_2$ (hypochlorite)

Of these reactions the last is preferred.

IN THE DRAWINGS

Figure 2:
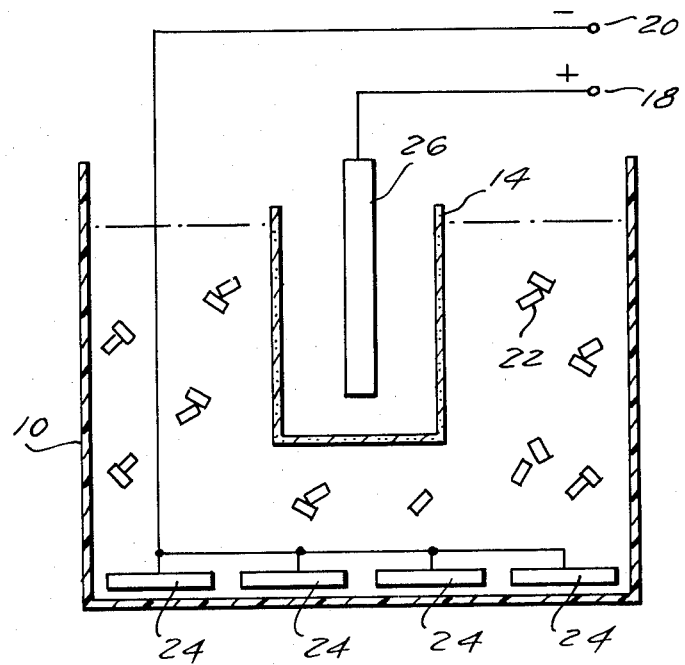

FIG. 1 is a schematic sectional view of a cell in accordance with the present invention wherein the cathode is contained in a membrane cup; and FIG. 2 is a schematic sectional view of a cell similar to FIG. 1 but wherein the anode is contained in the membrane cup.

DESCRIPTION OF SPECIFIC EXAMPLES

To generate hypochlorite, surprisingly good results have been obtained using a cell of the type shown in FIG. 1. The cell comprises treatment vessel 10 with four electrodes 12 placed on the bottom of the vessel, the vessel being formed of a non-conductive material such as polyvinyl chloride. Another electrode 16 was placed in a porous ceramic cup 14 and positioned in the center of the cell. The cup electrode 16 was connected as a cathode to a source of direct electric current at 20 and the bottom electrodes as anodes at 18. The cell was filled with packing elements 22 of polyethylene and a solution containing sodium chloride was introduced into the vessel so that the top of the cup was just above the solution level.

A series of tests were run at different conditions passing 20 gallons of solution through the cell obtaining the results set forth in Table I.

TABLE I

|  | 1 | 2 | 3 | 4 | 5 |
|---|---|---|---|---|---|
| Current (Amps) | 10 | 20 | 20 | 20 | 20 |
| Potential (V.DC) | 10 | 15.5 | 17.5 | 15 | 12 |
| Cl⁻ concentration gms/Liter | 20 | 20 | 20 | 20 | 30 |
| pH | 12.3 | 12.2 | 12 | 10 | 12.5 |
| T-initial (°F.) | 74 | 68 | 68 | 70 | 72 |
| T-final (°F.) | 80 | 110 | 105 | 85 | 107 |
| Time, Run (HRS.) | 3 | 5 | 4 | 1 | 5 |
| Cl₂-yield (Gms/Amp.HR.) | 0.311 | 0.522 | 0.524 | 0.528 | 0.475 |

The hypochlorite solution may be drawn off and utilized in a separate treatment vessel where it is mixed with the waste solution containing a pollutant, noxious or toxic substance which is to be oxidized. If desired the waste solution may be pumped into the cell in which case the oxidation causing precursor is continuously regenerated.

With waste solutions containing chromic acid reduction has been carried out by using a similar cell as shown in FIG. 3 but with the polarity reversed so that the anode 26 is in the cup and the cathodes 24 on the bottom of the vessel. In this case pellets of carbon were used, the pellets having a size of 1 mm × 3 mm were used as packing elements. Set forth in the copending application of Smith and Hayes, Ser. No. 764,255, filed Oct. 1, 1968 and entitled "Apparatus For And Process Of Removing Metal Ions And Other Pollutants From Aqueous Solutions And Moist Gaseous Streams." Into this cell and a similar cell, but with polyethylene pellets as a packing, such waste solution was introduced along with ferrous sulphate and results obtained as shown in Table II.

TABLE II

| | Carbon | Polyethylene |
|---|---|---|
| Current (Amps.) | 5 | 5 |
| Potential (V.DC) | 9.2 | 8.4 |
| $FeSO_4$ Concentration (Gms/Liter) | 20 | 20 |
| pH | 0.9 | .9 |
| Time, Run (HRS.) | .29 | 33 |
| $Cr_2O_3$ ++ Yield (Gms. Amp. Hr.) | 5.2 | 1.16 |

It was noted that in both cases chromium and iron ions migrated through the porous cup. The results obtained with the carbon pellets were exceedingly better and it is believed to be due to the large surface area which the pellets create as part of the electrode of the system outside the cup.

The destruction of cyanides in this electrolytic oxidation cell is illustrative when sodium chloride is used as starting material and is ionized.

$$Cl_2 + OH^- \rightarrow Cl^- + HClO$$

$$HClO + OH^- \rightarrow ClO^- + H_2O$$

$$Cl_2 + 2OH^- \rightarrow Cl^- + ClO^- + H_2O$$

or as it is customarily written $Cl_2 + 2NaOH\ NaCl + NaClO + H$. Thereafter when the cyanide is in water solution:

$$NaCN + Cl_2 \rightarrow CNCl + NaCl$$

$$CNCl + 2NaOH \rightarrow NaCNO + NaCl + H_2O$$

$$2NaCNO + 3NaOCl + H_2O \rightarrow$$

$$2CO_2 + N_2 + 3NaCl + 2NaOH..$$

As it can be seen from the above, the last reaction illustrates the complete destruction of the cyanide into carbon dioxide and nitrogen, both gases and both innocuous and substantially inert substances. Furthermore, the reaction also shows the production of sodium chloride, which is the starting material employed and which is again electrolytically decomposed to start the cycle again.

Consequently, in any given situation in which the substance to be destroyed may lend itself to its destruction in a manner in which the oxidation agent may be electrolytically "recycled," the chemical reaction may be based on the first mentioned four reactions (I to IV).

Thus, the present invention provides means for destroying various pollutants encountered in metal finishing industry, in chemical industry in which toxic substances are produced, or in destroying noxious substances which are either by-products in chemical processes or have been produced for a specific but no longer desirable purpose such as chemical warfare agents.

Furthermore, the present invention also is directed to the oxidation of compounds to produce the desired materials such as amides from amines, nitro group containing compounds from hydrocarbons containing hydroxy and amine groups, and converting noxious substances or poisonous substances to useful derivatives such as converting mustard gas into the $\beta$-$\beta'$ dichloro ethyl sulfoxide thereby rendering the same innocuous and in fact useful.

Still further, the present invention is predicated on the cyclic or the coupled cycle treatment in which the diluent carrying the noxious substances which are being rendered innocuous are reprocessed for subsequent use in the presence of oxidant producing material which oxidant producing materials are continuously regenerated in an oxidation cell while at the same time the presence of the reducing agents is minimized by isolating the electrolytically formed reducers from the oxidation reaction thus allowing regeneration of the oxidant producing material. Hence, if the diluent is reused and the oxidant producing material is recycled, it is called a coupled cycle treatment.

Thus, according to the present invention in the anode zone of the present oxidation cell the oxidation producing components formed are used while in the cathode zone of the cell the reducing components formed are isolated. For this reason and in order to render the reducing components ineffective to reverse the oxidation reaction, the cathode zone of the present cell is isolated from the remainder of the electrolytic cell by a porous cup or membrane.

The porous cup is of a sufficient porosity to allow electron migration and ionic passage but insufficient to allow the permeation of nascent hydrogen. Consequently, a membrane, a permselective membrane, is used which is capable of excluding hydrogen gas.

Of the permselective membranes, only those are used in which positively charged cations are allowed to migrate towards the cathode. Such selective migration may be permitted by materials such as sulfonated styrene or resins having an ion-resin structure able to receive and exchange cations.

As a porous cup material, a porcelain or plastic material which is non-conductive may be employed.

Further, as a third possibility, a membrane such as cellulose acetate may be employed which allows only the migration of electrons and which membrane is sufficiently dense or tight so that no ionized salts may be passed through the same.

As an example of the type of prior system used for in-line treatment of toxic carry-over, reference is made to U.S. Pat. No. 2,725,314 issued Nov. 29, 1955. As shown therein a waste solution neutralizer must be continuously fed into a recirculation reservoir to renew the neutralizer solution. With the present invention the required supplies of chlorine and caustic soda required by that system may be replaced by the present regenerative cell.

In accordance with the process disclosed herein, a tank or a plurality of tanks are provided into which the solution containing the pollutant or the noxious material being treated is continuously introduced. The oxidizing solution is electrolytically produced in this tank, the same serving as an electrolytic cell or in an adjacent cell separated from the tank. The oxidation producing starting material, e.g., NaCl is regenerated continuously and if needed is added to this tank. If a different cell is used for electrolytic decomposition of the compounds, then this electrolytically activated solution is pumped into the vessel into which the solution sought to be treated is introduced, while at the same time part of the solution is recycled to the oxidation cell for regeneration of the active oxidant.

In order to keep the solution regenerated, a constant stream of the solution to be treated is being recirculated plus any make up of needed material. As the oxidation causing material becomes replenished in the treating tank and the incoming wastes are decomposed the effluent stream is monitored for any residual amounts of toxicants which may be removed from the treating tank. Obviously, a number of tanks may be used to transfer a progressively treated waste solution supplied from one common source in which the oxidizing solution is produced, i.e., electrolyzed; and thus, progressively more impoverished solutions can be treated with progressively more powerful oxidizing solutions. Further, the process may also be carried out by having the anode and the cathode immersed in each of the treating tanks and continuously regenerating in the same tank the pollutant destroying oxidant according to the formula above.

Hence, it is seen that only a make-up amount of oxidant producing starting material, e.g., sodium chloride, need to be introduced into the tank. Furthermore, as it can be envisioned from the formulae, above illustrating the cyanide decomposition, the destruction reaction produces gases which will be given off and which can also be collected. Hence, whatever precipitants may form in the process such as the metals that were solubilized by the cyanide complexing agent, these may be readily removed through a trap door or trap exit at the bottom of the tank.

Consequently, the treated solution which is being continuously pumped into the tank and treated either batch-wise or step-wise until the complete destruction of the pollutant is achieved or progressively treated in other tanks using other oxidants in case of complex pollutants the treatment will lead to a completely pure and usable water which may be returned to the process, e.g., plating line such as for subsequent washing of the plated materials.

In a manner similar to the above, a number of other pollutants may be treated by any of the oxidizing agents illustrated above and which under the reaction conditions provide the most suitable and efficacious destruction of the pollutant.

Thus, making reference to equations I to IV, it is noted that the present process envisions the treating not only with any of the individual oxidizing agents but also in a combination with each other in different tanks or cells such that progressively more complex treatment of the same with a number or a combination of oxidants properly sequenced for most efficacious use when continuously regenerating the oxidant and destroying the pollutant.

As mentioned before, other compounds which may be similarly destroyed constitute such toxic or noxious substances as mustard gas which is oxidized to the sulfoxide according to the following reaction. The obtained compound that is the derivatives of mustard gas is useful as chemical intermediates for production of insecticides and thus, the destruction of mustard gas to convert the same to a useful compound illustrated the superior manner in which the present invention performs the useful applications of the same in the conversion of one compound to another or its complete destruction.

In accordance with the above invention, mustard gas suitably dissolved in any ordinary organic solvent or ethers and admixed with water to which an emulsifier may be added is electrolyzed to convert the same to a sulfoxide, i.e., $\beta, \beta'$ dichlorodiethylsulfoxide. The reaction scheme in this connection is as follows:

The obtained sulfoxide which is soluble in water is removed as in a recycle stream from the treating vessel and recovered by appropriate steps such as phase separation or solvent extraction. The purified solution including any residual amount of mustard gas originally not recovered by separation such as by breaking the emulsion etc., may be separated and returned to the treatment tank.

In a similar manner, methylhydroxyamine, ethylenehydroxyamine, or isopropylhydroxylamine are treated to convert the same to nitromethane, nitroethane or 2-nitropropane, according to the following reaction scheme, respectively: These nitro compounds can be used as fuel additives or high energy fuels.

In the event the oxidant is a gas such as ozone, the contact of same with the solution may be improved by means such as providing a packing in the oxidation cell and enclosing the cell in a container not open to atmosphere and/or by providing vigorous agitation and mixing of the waste solution.

In summary, the present invention is directed to a destruction of pollutants, or highly toxic substances by means of a simple system in which the undesired and material-destroying oxidants or reductants are continuously regenerated, as illustrated and discussed above.

What is claimed:

1. A process for producing an oxidant from a solution containing an electrolytically decomposable oxidation causing precursor compound for use with a waste solution such as pollutants, noxious or toxic substances comprising the steps of:

adding an electrolyticallly decomposable oxidation causing precursor compound to a solution and containing said solution in a vessel having at least a pair of electrodes including a cathode and an anode therein;

a bed including a multiplicity of particulate packing elements, contained in said vessel, said elements providing a circuitous path for gases generated electrolytically in said vessel whereby the vessel retention time of the generated gases is increased;

causing an electrical current to flow between said anode and said cathode causing an oxidant to be produced in said solution;

isolating the cathode electrode by a porous cup to prevent adding to the treatment solution reducing components not desired for the reaction; and using the preferred oxidant to oxidize a pollutant, noxious or toxic substance in solution in an oxidation zone.

2. The process according to claim 1 and further including the steps of:

continuously regenerating said oxidation causing precursor formed during an electro-chemical oxidation reaction; and removing the oxidant treated solution from said oxidation zone for recovery of same.

3. The process according to claim 1 wherein the oxidation causing precursor is a metal halide salt.

4. The process according to claim 1 wherein the oxidation causing precursor is sodium chloride.

5. The process according to claim 1 wherein a major portion of the packing elements include electrically conductive material.

6. The process according to claim 1 wherein a major portion of the packing elements include electrically non-conductive material.

7. A process for producing an oxidant from a solution containing an electrolytically decomposable oxidation causing precursor compound for use with a waste solution such as pollutants, noxious or toxic substances comprising the steps of:

adding an electrolytically decomposable oxidation causing precursor compound to a solution and containing said solution in a vessel having at least a pair of electrodes including a cathode and an anode therein;

a bed including a multiplicity of particulate packing elements also contained in said vessel, said elements providing a circuitous path for gases generated electrolytically in said vessel whereby the vessel retention time of the generated gases is increased;

causing an electrical current to flow between said anode and said cathode causing an oxidant to be produced in said solution;

isolating the cathode electrode by a permselective membrane to prevent adding to the treatment solution reducing components not desired for the reaction; and using the preferred oxidant to oxidize a pollutant, noxious or toxic substance in solution in an oxidation zone.

8. The process according to claim 7 and further including the steps of:

continuously regenerating said oxidation causing precursor formed during an electro-chemical oxidation reaction; and removing the oxidant treated solution from said oxidation zone for recovery of same.

9. A process for producing a reductant from a solution containing an electrolytically decomposable reduction causing precursor compound for use with a waste solution such as pollutants, noxious or toxic substances comprising the steps of:

adding an electrolytically decomposable reduction causing precursor compound to a solution and containing said solution in a vessel having at least a pair of electrodes including a cathode and an anode therein;

causing an electrical current to flow between said anode and said cathode causing a reductant to be produced in said solution isolating the anode electrode by a porous cup to prevent adding to the treatment solution oxidizing components not desired for the reaction;

a bed including a multiplicity of electrically conductive particulate packing elements also contained in said vessel, said elements providing a greater contact area for said cathode in the reducing zone; and using the preferred reductant to reduce a pollutant, noxious or toxic substance in solution in a reducing zone.

10. The process according to claim 9 and further including the steps of:

continuously regenerating said reductant causing precursor formed during an electro-chemical reduction reaction; and removing the reductant treated solution from said reduction zone for recovery of same.

11. The process according to claim 9 wherein the reduction causing precursor is ferrous sulphate.

12. A process for producing a reductant from a solution containing an electrolytically decomposable reduction causing precursor compound for use with a waste solution such as pollutants, noxious or toxic substances comprising the steps of:

adding an electrolytically decomposable reduction causing precursor compound to a solution and containing said solution in a vessel having at least a pair of electrodes including a cathode and an anode therein;

causing an electrical current to flow between said anode and said cathode causing a reductant to be produced in said solution;

isolating the anode electrode by a permselective membrane to prevent adding to the treatment solution oxidizing components not desired for the reaction;

a bed including a multiplicity of electrically conductive particulate packing elements, also contained in said vessel, said elements providing a greater contact area for said cathode in the reducing zone; and using the preferred reductant to reduce a pollutant, noxious or toxic substance in solution in a reducing zone.

13. The process according to claim 12 and further including the steps of:

continuously regenerating said reductant causing precursor formed during an electro-chemical reduction reaction; and removing the treated solution from said reduction zone for recovery of same.

14. The process according to claim 7 wherein a major portion of the packing elements include electrically conductive material.

15. The process according to claim 7 wherein a major portion of the packing elements include electrically non-conductive material.

16. The process according to claim 9 wherein a major portion of the packing elements include electrically conductive material.

17. The process according to claim 9 wherein a major portion of the packing elements include electrically non-conductive material.

18. The process according to claim 12 wherein a major portion of the packing elements include electrically conductive material.

19. The process according to claim 12 wherein a major portion of the packing elements include electrically non-conductive material.

20. The process according to claim 7 wherein the oxidation causing precursor is a metal halide salt.

21. The process according to claim 7 wherein the oxidation causing precursor is sodium chloride.

22. The process according to claim 12 wherein the reduction causing precursor is ferrous sulphate.

* * * * *